United States Patent
Fujii

(10) Patent No.: US 11,008,039 B2
(45) Date of Patent: May 18, 2021

(54) LANE CHANGE ASSIST APPARATUS FOR VEHICLE

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 15/950,386

(22) Filed: Apr. 11, 2018

(65) Prior Publication Data

US 2018/0297638 A1 Oct. 18, 2018

(30) Foreign Application Priority Data

Apr. 12, 2017 (JP) .............................. JP2017-078663
May 26, 2017 (JP) .............................. JP2017-104430

(51) Int. Cl.
*B62D 15/02* (2006.01)
*B60W 40/114* (2012.01)

(52) U.S. Cl.
CPC ....... *B62D 15/0255* (2013.01); *B60W 40/114* (2013.01); *B60W 2520/125* (2013.01); *B60W 2520/14* (2013.01)

(58) Field of Classification Search
CPC ............ B62D 15/0255; B60W 40/114; B60W 2520/14; B60W 2520/125; B60W 30/12; B60W 30/18163; B60W 2540/04; B60W 2540/20; B60W 2550/141; B60W 2550/10; B60W 2720/125; B60W 2720/12; B60W 2710/20; B60W 2720/14; B60W 2520/10

See application file for complete search history.

(56) References Cited

U.S. PATENT DOCUMENTS

| 6,185,492 B1 * | 2/2001 | Kagawa ............... B62D 15/025 701/41 |
| 6,275,778 B1 * | 8/2001 | Shimada ................ B25J 9/1633 100/245 |
| 7,403,219 B2 * | 7/2008 | Miyashita ............ G06K 9/4604 348/148 |

(Continued)

FOREIGN PATENT DOCUMENTS

| DE | 102018108572 A1 * | 10/2018 | ............ B60W 30/12 |
| EP | 1134364 B1 * | 5/2006 | ............ F02D 41/20 |

(Continued)

*Primary Examiner* — Behrang Badii
*Assistant Examiner* — Jalal C Coduroglu
(74) *Attorney, Agent, or Firm* — Sughrue Mion, PLLC

(57) ABSTRACT

A driving support ECU initializes a target trajectory calculation parameter at a start of LCA; calculates, based on the target trajectory calculation parameter, a target trajectory function representing a target lateral position which is a target position of an own vehicle in a lane width direction in accordance with an elapsed time t from the start of LCA; successively calculates a target lateral movement state amount of the own vehicle based on the target trajectory function and the elapsed time t; calculates a target yaw state amount of the own vehicle based on the target lateral movement state amount and a vehicle speed; and calculates a target control amount based on the target yaw state amount and the target lateral position.

7 Claims, 7 Drawing Sheets

(56) References Cited

U.S. PATENT DOCUMENTS

| | | | | |
|---|---|---|---|---|
| 7,509,211 | B2* | 3/2009 | Niwa | B60W 50/14 340/901 |
| 7,893,819 | B2* | 2/2011 | Pfeiffer | B60T 7/22 340/435 |
| 7,898,437 | B2* | 3/2011 | Okada | G01C 7/04 340/436 |
| 7,974,784 | B2* | 7/2011 | Moriizumi | B60R 21/013 701/301 |
| 8,090,493 | B2* | 1/2012 | Aso | B62D 1/28 701/31.9 |
| 8,271,174 | B2* | 9/2012 | Okada | B62D 15/02 |
| 8,401,737 | B2* | 3/2013 | Aso | G08G 1/0969 701/469 |
| 8,624,990 | B2* | 1/2014 | Ohtsubo | B60T 7/22 340/435 |
| 8,686,875 | B2* | 4/2014 | Inoue | E01F 9/559 340/932.2 |
| 8,914,185 | B2* | 12/2014 | Ueno | E01F 9/559 340/932.2 |
| 9,291,491 | B2* | 3/2016 | Tran | G01S 15/10 |
| 9,430,946 | B2* | 8/2016 | Akiyama | G08G 1/165 |
| 9,514,645 | B2* | 12/2016 | Hallek | G08G 1/166 |
| 9,527,441 | B2* | 12/2016 | Matsumura | B60W 10/04 |
| 9,805,275 | B2* | 10/2017 | Okuda | G08G 1/167 |
| 10,279,805 | B2* | 5/2019 | Hattori | B60W 30/0953 |
| 10,384,681 | B2* | 8/2019 | Masui | B60W 10/06 |
| 10,471,961 | B2* | 11/2019 | Masui | B60R 21/00 |
| 10,515,552 | B2* | 12/2019 | Miyata | B60W 30/18163 |
| 2002/0109402 | A1 | 8/2002 | Nakamura | B60W 10/184 303/146 |
| 2004/0024504 | A1* | 2/2004 | Salib | B60R 21/0132 701/38 |
| 2005/0246085 | A1* | 11/2005 | Salib | B60G 17/0195 701/70 |
| 2007/0282532 | A1* | 12/2007 | Yamamoto | B60R 21/0134 701/301 |
| 2010/0082195 | A1* | 4/2010 | Lee | G01C 21/12 701/25 |
| 2010/0169013 | A1* | 7/2010 | Nakamura | G08G 1/0969 701/469 |
| 2011/0102197 | A1* | 5/2011 | Herwich | E01F 9/559 340/932.2 |
| 2012/0166017 | A1* | 6/2012 | Kobayashi | B60T 7/22 701/1 |
| 2014/0074356 | A1* | 3/2014 | Bone | G08G 1/167 701/41 |
| 2014/0229069 | A1* | 8/2014 | Akiyama | B60W 10/18 701/41 |
| 2014/0236428 | A1* | 8/2014 | Akiyama | B60W 10/20 701/42 |
| 2015/0039178 | A1* | 2/2015 | Ishii | E01F 9/559 340/932.2 |
| 2015/0088382 | A1* | 3/2015 | Obuchi | B60W 30/14 701/41 |
| 2015/0094943 | A1* | 4/2015 | Yoshihama | B60W 30/09 701/301 |
| 2015/0134218 | A1* | 5/2015 | Ishida | B60W 30/12 701/70 |
| 2016/0098605 | A1* | 4/2016 | Okada | B60W 30/12 382/104 |
| 2016/0107687 | A1* | 4/2016 | Yamaoka | B62D 15/0255 701/41 |
| 2016/0185388 | A1* | 6/2016 | Sim | B60W 10/20 701/41 |
| 2016/0216709 | A1* | 7/2016 | Schweizer | G05D 1/0022 |
| 2016/0288785 | A1* | 10/2016 | Ezoe | B60W 30/18145 |
| 2016/0311323 | A1* | 10/2016 | Lee | B60K 35/00 |
| 2016/0327947 | A1* | 11/2016 | Ishikawa | B60W 50/14 |
| 2016/0368489 | A1* | 12/2016 | Aich | B60T 7/18 |
| 2017/0043808 | A1* | 2/2017 | Yang | G08G 1/143 |
| 2017/0088174 | A1* | 3/2017 | Inoue | B60T 8/17557 |
| 2018/0086338 | A1* | 3/2018 | Yamada | B60W 50/14 |
| 2018/0297638 | A1* | 10/2018 | Fujii | B60W 30/12 |
| 2018/0297639 | A1* | 10/2018 | Fujii | G05D 1/0212 |
| 2018/0297640 | A1* | 10/2018 | Fujii | B62D 15/0255 |
| 2018/0345978 | A1* | 12/2018 | Fujii | B62D 15/0255 |
| 2018/0346019 | A1* | 12/2018 | Fujii | B62D 1/286 |
| 2018/0346026 | A1* | 12/2018 | Fujii | B60W 30/09 |
| 2018/0346027 | A1* | 12/2018 | Fujii | B62D 15/0255 |
| 2018/0350242 | A1* | 12/2018 | Fujii | B60W 30/18163 |
| 2018/0354519 | A1* | 12/2018 | Miyata | B60W 10/20 |
| 2018/0357904 | A1* | 12/2018 | Miyata | B60W 10/04 |
| 2019/0039617 | A1* | 2/2019 | Miura | G08G 1/166 |
| 2019/0061766 | A1* | 2/2019 | Nishiguchi | B60W 30/18163 |
| 2019/0086511 | A1* | 3/2019 | Takeuchi | G01S 13/931 |
| 2019/0092333 | A1* | 3/2019 | Ishioka | B60Q 1/488 |
| 2019/0094856 | A1* | 3/2019 | Kawate | B60W 50/082 |
| 2019/0096258 | A1* | 3/2019 | Ide | B62D 15/025 |
| 2020/0079375 | A1* | 3/2020 | Takahashi | B60W 30/09 |

FOREIGN PATENT DOCUMENTS

| | | | | |
|---|---|---|---|---|
| EP | 2467291 | B1 * | 12/2015 | B60W 30/12 |
| EP | 3006295 | A1 * | 4/2016 | B60W 30/0956 |
| EP | 3095635 | A2 * | 11/2016 | G06K 9/00845 |
| EP | 3106368 | A1 * | 12/2016 | B62D 11/24 |
| JP | 7-179140 | A | 7/1995 | |
| JP | 2008-149855 | A | 7/2008 | |
| JP | 2010-6279 | A | 1/2010 | |
| JP | 2014049075 | A * | 3/2014 | G08G 1/167 |
| JP | 2014061792 | A * | 4/2014 | B60T 7/22 |
| JP | 2015022759 | A * | 2/2015 | B60W 40/04 |
| JP | 2015-58890 | A | 3/2015 | |
| JP | 2015202758 | A * | 11/2015 | G05B 19/416 |
| JP | 2016004425 | A * | 1/2016 | B60W 40/04 |
| JP | 2016-29559 | A | 3/2016 | |
| JP | 2016126360 | A * | 7/2016 | B60W 30/095 |
| JP | 2018047828 | A * | 3/2018 | B60W 30/10 |
| KR | 20140034934 | A * | 3/2014 | B60W 30/045 |
| KR | 101390819 | B1 * | 5/2014 | B60W 40/04 |
| KR | 101551096 | B1 * | 9/2015 | B62D 15/0255 |
| KR | 20160009828 | A * | 1/2016 | H04L 67/12 |
| KR | 20170019794 | A * | 2/2017 | B60W 30/12 |
| WO | WO-2012049866 | A1 * | 4/2012 | G05B 19/416 |
| WO | WO-2016082995 | A1 * | 6/2016 | G08G 1/096775 |
| WO | WO-2016104042 | A1 * | 6/2016 | B60R 21/00 |
| WO | WO-2016124178 | A1 * | 8/2016 | G08G 1/0137 |
| WO | WO-2017022448 | A1 * | 2/2017 | B60W 30/14 |
| WO | WO-2017039047 | A1 * | 3/2017 | B60W 40/02 |
| WO | WO-2017056726 | A1 * | 4/2017 | B60W 30/08 |
| WO | WO-2018055916 | A1 * | 3/2018 | B60W 30/02 |

* cited by examiner

LANE CHANGE ASSIST APPARATUS FOR VEHICLE

BACKGROUND OF THE INVENTION

1. Field of the Invention

The present invention relates to a lane change assist apparatus for a vehicle configured to assist/support a steering operation for changing lanes.

2. Description of the Related Art

Conventionally, a lane change assist apparatus has been known which is configured to assist a steering operation (steering wheel operation) for changing lanes. Such a lane change assist apparatus calculates a target trajectory in such a manner that a vehicle changes a traveling direction of the own vehicle toward an adjacent lane being a destination of changing lanes. The lane change assist apparatus controls a steering angle of right and left steered wheels in such a manner that the vehicle travels along the calculated target trajectory.

For example, an apparatus (hereinafter referred to as a "conventional apparatus"), as proposed in Japanese Patent Application Laid-Open (kokai) 2008-149855 A, successively (sequentially) calculates target traveling (passing) positions of the vehicle based on position information regarding a plurality of points along a center line of an adjacent lane, and information on the current position of the vehicle. The conventional apparatus calculates a target trajectory based on the target traveling positions.

However, even when and/or after the driver operates an accelerator pedal to change a vehicle speed after a start of the lane change assist, the conventional apparatus still uses the target trajectory calculated before the start of the lane change assist. In this case, since the traveling state of the vehicle differs from the traveling state assumed when determining the target trajectory due to the change of the vehicle speed, stable lane change may not be achieved.

On the other hand, an apparatus is considered which frequently recalculates the target trajectory every time a very short time elapses after the lane change assist is started. However, in such an apparatus, the calculation load for the target trajectory becomes high. Further, there is a risk that the driver may feel discomfort due to the change of the target trajectory.

The present invention is made to cope with the problem described above. That is, one of objects of the present invention is to provide a lane change assist apparatus for having a vehicle change lanes in a smooth manner while suppressing the calculation load.

SUMMARY OF THE INVENTION

In order to achieve the above-mentioned object, according to one embodiment of the present invention, there is provided a lane change assist apparatus for a vehicle, including:

a lane recognition unit (12) for recognizing a lane to detect a relative positional relationship of an own vehicle with respect to the lane; and an assist control unit (10, 20) for, based on the relative positional relationship of the own vehicle with respect to the lane, executing a lane change assist control through controlling steering of a steered wheel in such a manner that the own vehicle changes lanes toward an adjacent lane.

The assist control unit includes:

a target trajectory function determining/calculation unit (S14) for, at a start of the lane change assist control, determining/defining/calculating a target trajectory function (y(t)) representing a relationship between an elapse time from the start of the lane change assist control and a target lateral position which is a target position of the own vehicle in a lane width direction;

a target lateral position calculation unit (S15) for, while the lane change assist control is being executed, successively (sequentially) calculating the target lateral position based on the target trajectory function calculated at the start of the lane change assist control, and the elapse time from the start of the lane change assist control;

a target state amount calculation unit (S15, S16) for, while the lane change assist control is being executed, successively (sequentially) acquiring a vehicle speed of the own vehicle, and successively (sequentially) calculating a target yaw state amount which is a target value related to a movement for changing a direction of the own vehicle, based on the target trajectory function calculated at the start of the lane change assist control, the elapse time from the start of the lane change assist control, and the vehicle speed; and a steering control unit (S17, S18) for controlling the steering of the steered wheel based on the target lateral position and the target yaw state amount.

In the lane change assist apparatus, the lane recognition unit recognizes the lane to detect the relative positional relationship of the own vehicle with respect to the lane. The lane is, for example, an area sectioned by white lines. It is necessary to recognize the lane to determine/define a target trajectory for having the own vehicle travel. Based on the relative positional relationship of the own vehicle with respect to the lane, the assist control unit controls the steering of the steered wheel in such a manner that the own vehicle changes lanes toward the adjacent lane. This allows the own vehicle to change lanes toward the adjacent lane.

The assist control unit includes, as means for having the own vehicle change lanes toward the adjacent lane, the target trajectory function calculation unit, the target lateral position calculation unit, the target state amount calculation unit, and the steering control unit.

At the start of the lane change assist control, the target trajectory function calculation unit calculates (determines/derives through a calculation) the target trajectory function (y(t)) for determining (representing) the target lateral position which is the target position of the own vehicle in the lane width direction (road width direction) in accordance with the elapse time from the start of the lane change assist control (that is, for each elapse time from the start of the lane change assist control). This target trajectory function is a function representing the relationship between the elapse time from the start of the lane change assist control and the target lateral position which is the target position of the own vehicle in the lane width direction.

While the lane change assist control is being executed, the target lateral position calculation unit successively (sequentially) calculates the target lateral position based on the target trajectory function calculated at the start of the lane change assist control, and the elapse time from the start of the lane change assist control. Therefore, controlling the steering of the steered wheel in such a manner that the lateral position of the own vehicle matches (becomes equal to) the target lateral position allows/enables the own vehicle to change lanes according to a desired trajectory.

In the case where the vehicle speed is varied (or fluctuated) during the execution of the lane change assist control, the lane change according to the lane change assist control may become unstable. Therefore, while the lane change assist control is being executed, the target state amount calculation unit successively (sequentially) acquires the vehicle speed of the own vehicle, and successively (sequentially) calculates the target yaw state amount which is the target value related to the movement for changing the direction of the own vehicle (direction of an vehicle body), based on (through use of) the target trajectory function calculated at the start of the lane change assist control, the elapse time from the start of the lane change assist control, and the vehicle speed. The expression: "successively (sequentially) acquiring the vehicle speed" means "acquiring vehicle speed information every time a predetermined time period elapses". Further, the expression: "successively (sequentially) calculating the target yaw state amount" means "calculating the target yaw state amount every time a predetermined time period elapses".

Further, the steering control unit controls the steering of the steered wheel based on the target lateral position and the target yaw state amount. That is, the steering control unit controls the steering of the steered wheel in such a manner that the lateral position of the own vehicle matches (becomes equal to) the target lateral position and the yaw state amount for changing the direction of the own vehicle matches (becomes equal to) the target yaw state amount.

Thus, according to one embodiment of the present invention, it is not necessary to successively (sequentially) and repeatedly determine/calculate the target trajectory function (even when the vehicle speed is varied). The target yaw state amount is successively (sequentially) calculated based on the target trajectory function calculated at the start of the lane change assist control, the acquired vehicle speed, and the elapse time from the start of the lane change assist control. Therefore, changing lanes smoothly can be performed, while reflecting the accelerator pedal operation performed by the driver and suppressing the calculation load.

In an aspect of the present invention, the target state amount calculation unit includes:

a target lateral movement state amount calculation unit (S15) for successively (sequentially) calculating a target lateral movement state amount which is a target value related to a movement of the own vehicle in the lane width direction, based on the target trajectory function calculated at the start of the lane change assist control, and the elapse time from the start of the lane change assist control; and a target yaw state amount calculation unit (S16) for successively (sequentially) calculating the target yaw state amount based on the acquired vehicle speed and the calculated target lateral movement state amount.

In the above aspect of the present invention, the target state amount calculation unit includes the target lateral movement state amount calculation unit and the target yaw state amount calculation unit. The target lateral movement state amount calculation unit successively (sequentially) calculates the target lateral movement state amount which is the target value related to the movement of the own vehicle in the lane width direction, based on the target trajectory function calculated at the start of the lane change assist control, and the elapse time from the start of the lane change assist control. For example, by differentiating the target trajectory function with respect to time, the target lateral speed (speed in the lane width direction) of the own vehicle at that time point can be acquired. Further, by second-order differentiating the target trajectory function with respect to time, the target lateral acceleration (acceleration in the lane width direction) of the own vehicle at that time point can be acquired. Therefore, the target value (target lateral movement state amount) related to the movement of the own vehicle in the lane width direction is successively (sequentially) calculated by using the target trajectory function.

As the vehicle speed of the own vehicle is acquired, the target yaw state amount can be calculated, which is the target value related to the movement (movement for changing the direction of the own vehicle) required to obtain the target lateral movement state amount of the own vehicle. In view of the above, the target yaw state amount calculation unit successively (sequentially) calculates the target yaw state amount based on the vehicle speed and the target lateral movement state amount. This target yaw state amount may be, for example, a target value of an angle (yaw angle) on a horizontal plane between a direction in which the own vehicle is facing/directing and a direction of the lane, or a target value of a yaw rate, or a target value of a curvature of the target trajectory.

Therefore, according to the above aspect of the present invention, the target yaw state amount of the own vehicle can be appropriately calculated, and the own vehicle can smoothly change lanes while reflecting the driver's accelerator pedal operation.

In an aspect of the present invention, the target lateral movement state amount calculation unit (S15) is configured to calculate, as the target lateral movement state amount, a target lateral speed (vy*) which is a target value of a speed of the own vehicle in the lane width direction, and the target yaw state amount calculation unit (S16) is configured to calculate, as the target yaw state amount, by using an arc sine of a value obtained by dividing the target lateral speed by the vehicle speed, a target yaw angle ($\theta y^* = \sin^{-1}(vy^*/v)$) which is a target value of an angle, on a horizontal plane, formed between a direction in which the own vehicle is facing/directing and a direction of the lane.

In the above aspect of the present invention, the target lateral movement state amount calculation unit calculates, as the target lateral movement state amount, the target lateral speed (vy*) which is the target value of the speed of the own vehicle in the lane width direction. In this configuration, the target lateral movement state amount calculation unit may calculate at least the target lateral speed, but may calculate any other lateral movement state amounts) in addition to the target lateral speed. The target yaw state amount calculation unit calculates, as the target yaw state amount, by using an arc sine of the value obtained by dividing the target lateral speed by the vehicle speed, the target yaw angle which is the target value of the angle on the horizontal plane between the direction in which the own vehicle is facing and the direction of the lane. In this configuration, the target yaw state amount calculation unit may calculate at least the target yaw angle, but may calculate any other yaw state amount(s) in addition to the target yaw angle.

In the above manner, the steering of the steered wheel is controlled based on the target lateral position and the target yaw angle. Therefore, the own vehicle can be made to change lanes smoothly according to the target trajectory function.

In an aspect of the present invention, the target lateral movement state amount calculation unit (S15) is configured to calculate, as the target lateral movement state amount, a target lateral acceleration (ay*) which is a target value of an acceleration of the own vehicle in the lane width direction, and the target yaw state amount calculation unit (S16) is configured to calculate, as the target yaw state amount, by dividing the target lateral acceleration by the vehicle speed, a target yaw rate ($\gamma^*=ay^*/v$) which is a target value of a yaw rate of the own vehicle.

In the above aspect of the present invention, the target lateral movement state amount calculation unit calculates, as the target lateral movement state amount, the target lateral acceleration which is the target value of the acceleration of the own vehicle in the lane width direction. In this configuration, the target lateral movement state amount calculation unit may calculate at least the target lateral acceleration, but may calculate any other lateral movement state amount(s) in addition to the target lateral acceleration. Further, the target yaw state amount calculation unit calculates, as the target yaw state amount, by dividing the target lateral acceleration by the vehicle speed, the target yaw rate which is the target value of the yaw rate of the own vehicle. In this configuration, the target yaw state amount calculation unit may calculate at least the target yaw rate, but may calculate any other target yaw state amount(s) in addition to the target yaw rate.

In this manner, the steering of the steered wheel is controlled based on the target lateral position and the target yaw rate. Therefore, the own vehicle can be made to change lanes smoothly according to the target trajectory function.

In an aspect of the present invention, the target lateral movement state amount calculation unit (S15) is configured to calculate, as the target lateral movement state amount, a target lateral acceleration (ay*) which is a target value of an acceleration of the own vehicle in the lane width direction, and the target yaw state amount calculation unit (S16) is configured to calculate, as the target yaw state amount, by dividing the target lateral acceleration by a square value of the vehicle speed, a target curvature ($Cu^*=ay^*/v^2$) which is a curvature of a target trajectory expressed by the target trajectory function.

In the above aspect of the present invention, the target lateral movement state amount calculation unit calculates, as the target lateral movement state amount, the target lateral acceleration which is the target value of the acceleration of the own vehicle in the lane width direction. In this configuration, the target lateral movement state amount calculation unit may calculate at least the target lateral acceleration, but may calculate any other target lateral movement state amount(s) in addition to the target lateral acceleration. Further, the target yaw state amount calculation unit calculates, as the target yaw state amount, by dividing the target lateral acceleration by the square value of the vehicle speed, the target curvature which is the curvature of the target trajectory expressed by the target trajectory function. In this configuration, the target yaw state amount calculation unit may calculate at least the target curvature, but may calculate any other target yaw state amount(s) in addition to the target curvature.

In this manner, the steering of the steered wheel is controlled based on the target lateral position and the target curvature. Therefore, the own vehicle can be made to change lanes smoothly according to the target trajectory function.

In an aspect of the present invention, the target trajectory function calculation unit (S14) is configured to calculate the target trajectory function based on (or by using at least):

(i) a lateral position (y0) representing a position of the own vehicle in the lane width direction at the start of the lane change assist control, a lateral speed (vy0) representing a speed of the own vehicle in the lane width direction at the start of the lane change assist control, and a lateral acceleration (ay0) representing an acceleration of the own vehicle in the lane width direction at the start of the lane change assist control;

(ii) the target lateral position (y1) of the own vehicle at the completion of the lane change assist control, the target lateral speed (vy1) of the own vehicle at the completion of the lane change assist control, and the target lateral acceleration (ay1) of the own vehicle at the completion of the lane change assist control; and (iii) a target lane change time period (tlen) which is a target time period from the start of the lane change assist control to the completion of the lane change assist control.

In the above aspect of the present invention, the target trajectory function calculation unit is configured to calculate the target trajectory function based on:

(i) the lateral position of the own vehicle at the start of the lane change assist control, the lateral speed of the own vehicle at the start of the lane change assist control, and the lateral acceleration of the own vehicle at the start of the lane change assist control;

(ii) the target lateral position of the own vehicle at the completion of the lane change assist control, the target lateral speed (target value of speed in the lane width direction) of the own vehicle at the completion of the lane change assist control, and the target lateral acceleration (target value of acceleration in the lane width direction) of the own vehicle at the completion of the lane change assist control; and (iii) the target lane change time period.

Therefore, regarding the movement of the own vehicle in the lateral direction (lane width direction), the target trajectory function can be obtained which enables transition from the movement state at the start of the lane change assist control to the target movement state at the completion of the lane change assist control. This enables the own vehicle to change lanes smoothly.

In an aspect of the present invention, the target trajectory function (y(t)) is expressed by a fifth-order function with the elapsed time which serves as a variable, the target lateral speed of the own vehicle at the completion of the lane change assist control, and the target lateral acceleration of the own vehicle at the completion of the lane change assist control are set to zero, and the target lateral position of the own vehicle at the completion of the lane change assist control is set to a center position of the adjacent lane in the lane width direction.

According to the above aspect of the present invention, the target trajectory function can be obtained which can achieve smooth transition of the movement of the own vehicle in the lateral direction between the state at the start of the lane change assist control and the state at the completion of the lane change assist control. After the completion of the lane change assist control, it is possible to have the own vehicle travel according to (or in the vicinity of) the center position of the adjacent lane in the lane width direction as it is. Therefore, the own vehicle can be made to change lanes more smoothly.

In the above description, references used in the following descriptions regarding embodiments are added with parentheses to the elements of the present invention, in order to assist in understanding the present invention. However, those references should not be used to limit the scope of the invention.

DETAILED DESCRIPTION OF THE EMBODIMENTS

A lane change assist apparatus according to the present invention will next be described with reference to the drawings.

Figure 1:
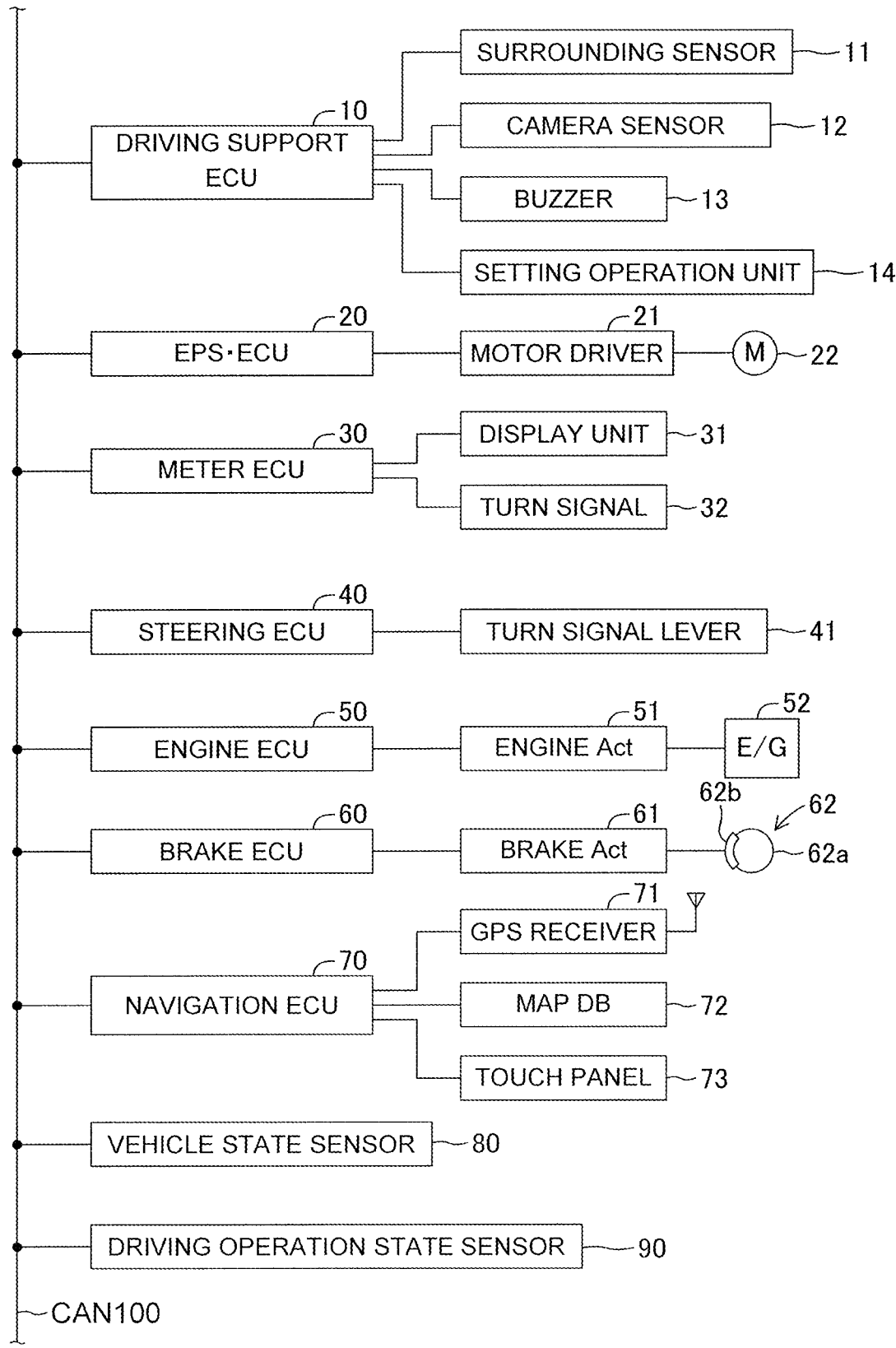
FIG. 1 is a schematic configuration diagram for illustrating a lane change assist apparatus for a vehicle according to an embodiment of the present invention.

The lane change assist apparatus according to the embodiment of the present invention is applied to a vehicle (hereinafter also referred to as an "own vehicle" in order to be distinguished from other vehicles). The lane change assist apparatus, as illustrated in FIG. 1, includes a driving support (assist) ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed (hereinafter also referred to as a "vehicle speed v") of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter, referred to as "sensor information") detected by the vehicle state sensors 80 and the driving operation state sensors 90 is transmitted to the CAN 100. Each ECU can use the sensor information transmitted to the CAN 100 as appropriate. The sensor information may be information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
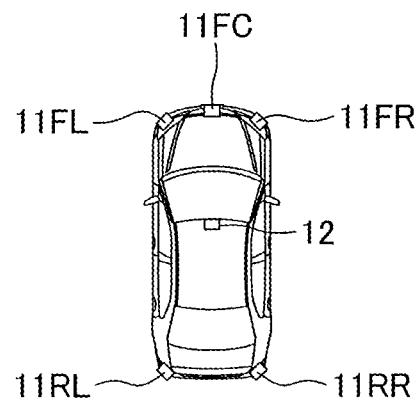
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver (radar transmitting/receiving part) (not shown) and a signal processor (not shown). The radar transceiver radiates a radio wave in a millimeter waveband (hereinafter referred to as a "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. By using the surrounding information, the driving support ECU 10 can detect (i) a front-rear direction component and a lateral direction component of the distance between the own vehicle and the three-dimensional object, and (ii) a front-rear direction component and a lateral direction component of the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle.

In this embodiment, the surrounding sensors 11 are radar sensors, but other sensors such as clearance sonars and LIDAR (Laser Imaging Detection and Ranging) sensors can be employed instead.

Further, a camera sensor 12 is connected to the driving support ECU 10. The camera sensor 12 includes a camera unit and a lane recognition unit. The lane recognition unit analyzes image data obtained based on an image taken by the camera unit to recognize a white line(s) of a road. The camera sensor 12 (camera unit) photographs a landscape in front (ahead) of the own vehicle. The camera sensor 12 (lane recognition unit) supplies information on the recognized white line(s) to the driving support ECU 10 every time a predetermined time period elapses.

The camera sensor 12 recognizes a lane which is a region sectioned by the white lines, and detects a relative positional relationship of the own vehicle with respect to the lane based on a positional relationship between the white lines and the own vehicle. Hereinafter, the "position" of the own vehicle means the position of the center of gravity. Further, a "lateral position" of the own vehicle to be described later means the position of the center of gravity in the lane width direction. In addition, a "lateral speed" of the own vehicle means the speed of the center of gravity of the own vehicle in the lane width direction. Furthermore, a "lateral acceleration" of the own vehicle means the acceleration of the center of gravity of the own vehicle in the lane width direction. These are calculated and obtained based on the relative positional relationship between the own vehicle and the white lines detected by camera sensor 12. In the present embodiment, the position of the own vehicle refers to the position of the center of gravity, but it is not necessarily limited to the center of gravity position. A predetermined specific position (for example, the center position of the own vehicle in plan view) of the vehicle may be adopted as the position of the own vehicle.

Figure 3:
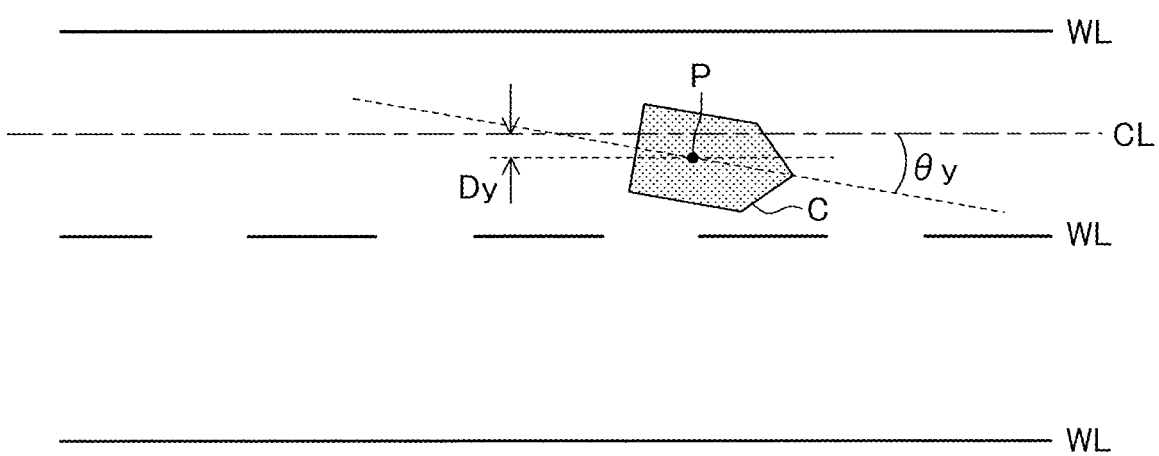
FIG. 3 is a diagram for illustrating lane-related vehicle information.

As illustrated in FIG. 3, the camera sensor 12 sets/determines a lane center line CL corresponding to a center position in a width direction of the right and left white lines WL in a lane on/in which the own vehicle is traveling. The lane center line CL is used as a target travel line in the lane trace assist control to be described later. Further, the camera sensor 12 calculates a curvature Cu of a curve of the lane center line CL.

Further, the camera sensor 12 calculates the position and the direction of the own vehicle in the lane sectioned by the right and left white lines WL. For example, as illustrated in FIG. 3, the camera sensor 12 calculates a distance Dy(m) in the lane width direction between the position P of the center of gravity of the own vehicle C and the lane center line CL, that is, the distance Dy by which the own vehicle C is shifted (deviates) from the lane center line CL in the lane width direction. This distance Dy is referred to as a "lateral difference Dy". Further, the camera sensor 12 calculates an angle formed between the direction of the lane center line CL and the direction in which the own vehicle C is facing/directing, that is, an angle θy(rad) by which the direction in which the own vehicle C is facing/directing is shifted (deviates) in a horizontal plane direction from the direction of the lane center line CL. This angle θy is referred to as a "yaw angle θy". When the lane is curved, because the lane center line CL is curved in the same manner, the yaw angle θy is an angle formed between the direction in which the own vehicle C is facing/directing and the direction of a tangent line of this curved lane center line CL. In the following, information (Cu, Dy, and By) representing the curvature Cu, the lateral difference Dy, and the yaw angle θy is referred to as "lane-related vehicle information". Regarding the lane-related vehicle information, the lateral direction (right and left direction) with respect to the lane center line CL is specified by positive and negative signs.

Further, every time a predetermined time period elapses, the camera sensor 12 also supplies, to the driving support ECU 10, information relating to the white lines, for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing the white line to change lanes. Otherwise, e.g., when the white line is a broken line (white line intermittently formed at certain intervals), the vehicle is allowed to cross the white line to change lanes. The lane-related vehicle information (Cu, Dy, and By) and the information relating to the white lines are collectively referred to as "lane information".

In this embodiment, the camera sensor 12 calculates the lane information. Alternatively, the driving support ECU 10 may be configured to analyze the image data transmitted from the camera sensor 12 to acquire/obtain the lane information.

Further, the camera sensor 12 can also detect a three-dimensional object present in front (ahead) of the own vehicle based on the image data. Therefore, the camera sensor 12 may calculate and acquire not only the lane information but also front surrounding information. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input transmitted from the driving support ECU 10 and produces a sound. The driving support ECU 10 sounds the buzzer 13 when, for example, the driving support ECU 10 notifies/informs the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be energized by the notification ECU. In this configuration, the driving support ECU 10 transmits a buzzer sounding command to the notification ECU.

Further, in place of or in addition to the buzzer 13, a vibrator for transmitting vibration for notification for the driver may be provided. For example, the vibrator is provided to a steering wheel to vibrate the steering wheel, to thereby alert the driver.

The driving support ECU 10 executes the lane change assist control, the lane trace assist control, and the adaptive cruise control, based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) with the steering torque sensor mounted in the steering shaft, and controls energization of the motor driver 21 based on the steering torque to drive the steering motor 22. The assist motor is driven as described above to apply/add the steering torque to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount specified by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed through the display command on the display unit 31. As the display unit 31, in place of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged at a right or left position of the own vehicle according to the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41. The turn signal lever 41 is an operation unit for working (intermittently flashing) the turn signal 32, and is mounted in a steering column. The turn signal lever 41 is mounted to be swingable about a support shaft with/at a two-stage operation stroke in each of a clockwise operation direction and a counterclockwise operation direction.

Figure 4:
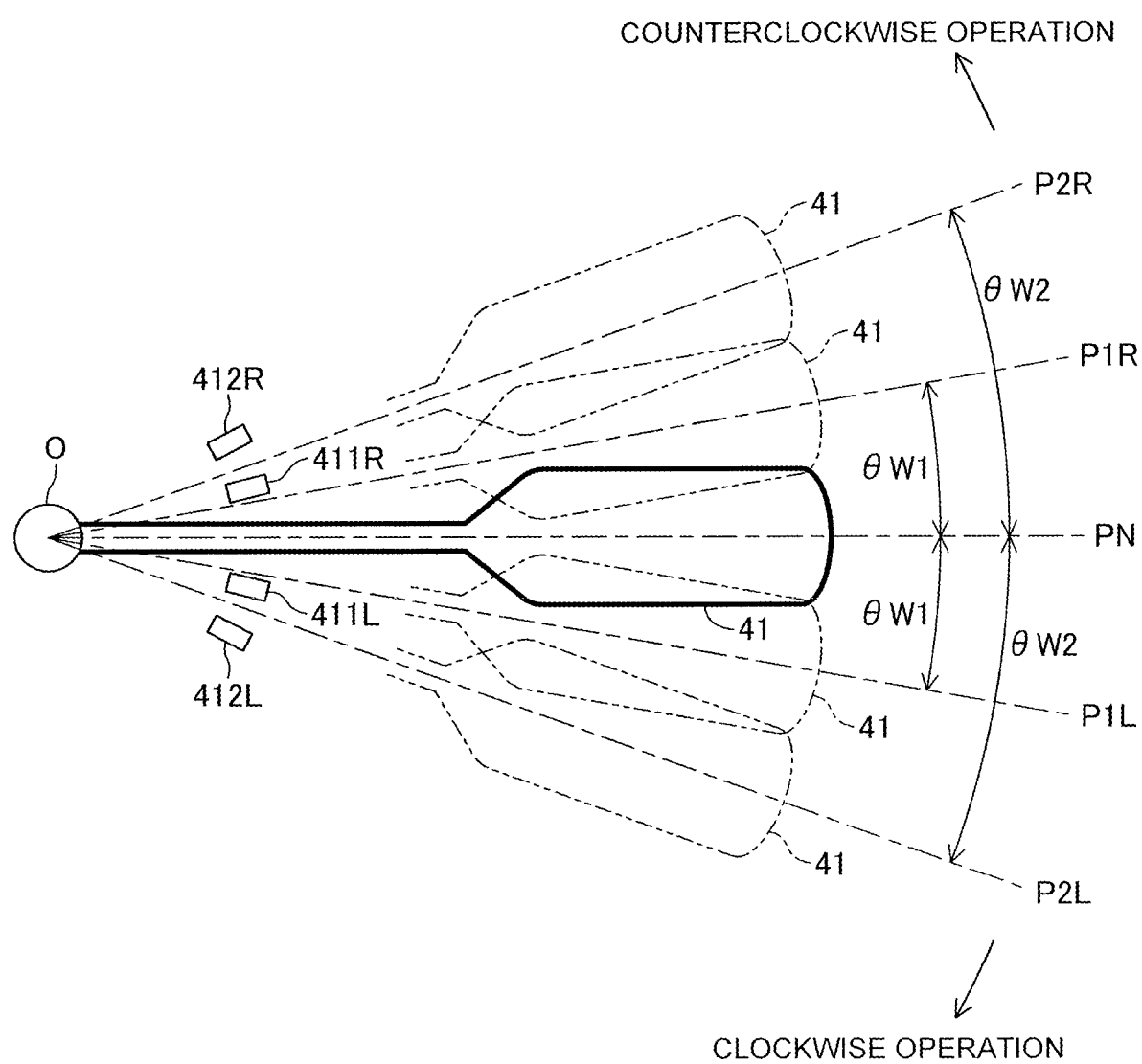
FIG. 4 is a diagram for illustrating actuation of a turn signal lever.

In this embodiment, the turn signal lever 41 is also used as an operation unit operated by the driver when the driver requires the execution of the lane change assist control. As illustrated in FIG. 4, the turn signal lever 41 is configured to be able to be operated selectively between (i) a first stroke position P1L (P1R), which is a position at which the turn signal lever 41 is rotated by a first angle θW1 from a neutral position PN, and (ii) a second stroke position P2L (P2R), which is a position at which the turn signal lever 41 is rotated by a second angle θW2 (>θW1) from the neutral position PN, in each of the clockwise operation direction and the counterclockwise operation direction about a support shaft O. In a state in which the turn signal lever 41 is in the first stroke position P1L (P1R), when the driver cancels the lever operation (that is, the driver releases his/her hand from the turn signal lever 41), the turn signal lever 41 is automatically returned to the neutral position PN. In a state in which the turn signal lever 41 is in the second stroke position P2L (P2R), even when the driver cancels the lever operation, the turn signal lever 41 is held/maintained at the second stroke position P2L (P2R) by a mechanical lock mechanism (not shown). Further, in a state in which the turn signal lever 41 is held at the second stroke position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN.

The turn signal lever 41 includes a first switch 411L (411R) that is turned on only when the turn signal lever 41 is tilted/rotated so as to be at the first stroke position P1L (P1R), and a second switch 412L (412R) that turns on only when the turn signal lever 41 is tilted/rotated to so as to be at the second stroke position P2L (P2R).

The steering ECU 40 detects an operation state of the turn signal lever 41 based on the state of the first switch 411L (411R) and the state of the second switch 412L (412R). In each of the state in which turn signal lever 41 is tilted to the first stroke position P1L (P1R), and the state in which the turn signal lever 41 is tilted to the second stroke position P2L (P2R), the steering ECU 40 transmits to the meter ECU 30 the turn signal flashing command including information representing the operation direction (clockwise or counterclockwise direction) of the turn signal lever 41.

Further, when the steering ECU 40 detects that the turn signal lever 41 is continuously held at the first stroke position P1L (P1R) for a predetermined set time (lane-change-request-determination time: for example, 1 second) or more, the steering ECU 40 outputs/transmits to the driving support ECU 10 a lane change assist request signal including the information representing the operation direction (clockwise or counterclockwise direction) of the turn signal lever 41. Therefore, when the driver wishes to receive assistance for lane change (assistance provided by the lane change assist control) during driving, the driver may tilt the turn signal lever 41 to the first stroke position P1L (P1R) in a lane change direction, and hold the turn signal lever 41 for the predetermined set time or more. Such an operation is referred to as a "lane change assist request operation".

In this embodiment, the turn signal lever 41 is used as the operation unit for requesting the lane change assist control. Alternatively, a dedicated operation unit for requesting the lane change assist control may be provided in the steering wheel and the like.

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration) of the own vehicle.

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to the vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, the road lane width, the number of lanes of the road, and the position of the lane center line of each lane) representing the shape and the position of the road for each section of the road. Further, the road information includes road type information for enabling distinction of whether or not the road is a road for exclusive use by automobiles, and the like.

<Control Processing Performed by Driving Support ECU 10>

Next, control processing performed by the driving support ECU 10 is described. Under a state in which both of the lane trace assist control and the adaptive cruise control are being executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control provides/generates the steering torque applied to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset/shifted in the lane width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested through the operation applied to the setting operation unit 14. When the LTA is requested, the driving support ECU 10 calculates a target steering angle $\theta lta^*$ in accordance with Expression (1) based on the above-mentioned lane-related vehicle information (Cu, Dy, and $\theta y$) every time a predetermined time period (calculation period) elapses.

$$\theta lta^* = Klta1 \cdot Cu + Klta2 \cdot \theta y + Klta3 \cdot Dy + Klta4 \cdot \Sigma Dy \quad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference between the direction of the own vehicle and the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional gap (positional difference) between the own vehicle and the lane center line CL in the lane width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value $\Sigma Dy$ of the lateral difference Dy is decreased. That is, the fourth term on the right-hand side is a steering angle component calculated by feed-back control with the target value of the integral value $\Sigma Dy$ being set to zero.

A target steering angle $\theta lta^*$ becomes an angle to have the own vehicle travel toward the left direction, for example,
  when the lane center line CL curves to the left (direction),
  when the own vehicle is laterally shifted/deviated in the right direction from the lane center line CL, or
  when the own vehicle is facing/directing to the right (direction) with respect to the lane center line CL.

Further, a target steering angle $\theta lta^*$ becomes an angle to have the own vehicle travel toward the right direction,
  when the lane center line CL curves to the right (direction),
  when the own vehicle is laterally shifted/deviated in the left direction from the lane center line CL, or
  when the own vehicle is facing/directing to the left (direction) with respect to the lane center line CL.

Therefore, a calculation according to the Expression (1) is made with use of symbols (plus and minus) corresponding to the right/left direction.

The driving support ECU 10 outputs/transmits, to the EPS ECU 20, a command signal including information on (representing) the target steering angle $\theta lta^*$ that is the calculation result. The EPS ECU 20 controls (drives) the steering motor 22 so that the steering angle follows (becomes equal to) the target steering angle $\theta lta^*$. In this embodiment, the driving support ECU 10 outputs/transmits the command signal including information on (representing) the target steering angle $\theta lta^*$ to the EPS ECU 20, but the driving support ECU 10 may calculate a target torque for obtaining the target steering angle $\theta lta^*$, and output/transmit, to the EPS ECU 20, a command signal including information on (representing) the target torque that is the calculation result. The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle at a predetermined distance, based on the surrounding information. When there is no preceding vehicle, the adaptive cruise control has the own vehicle travel at a constant set vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested through the operation applied to the setting operation unit 14. That is, the driving support ECU 10 is configured to select a following-objective-vehicle based on the surrounding information acquired from the surrounding sensors 11 when the ACC is requested. For example, the driving support ECU 10 determines whether or not an other-vehicle(s) is in a following-objective-vehicle area defined in advance.

When the other-vehicle is in the following-objective-vehicle area for a predetermined time period or more, the driving support ECU 10 selects the other-vehicle as the following-objective-vehicle. The driving support ECU 10 sets a target acceleration in such a manner that the own vehicle follows the following-objective-vehicle. Further, when no other-vehicle is present in the following-objective-vehicle area, the driving support ECU 10 sets the target acceleration based on a set vehicle speed and a detected vehicle speed (vehicle speed detected by the vehicle speed sensor) in such a manner that the detected vehicle speed of the own vehicle matches (becomes equal to) the set vehicle speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration. On the other hand, when the driver operates the accelerator pedal during the ACC, the driving support ECU 10 prioritizes the accelerator pedal operation over the ACC, thereby accelerating the own vehicle according to the accelerator pedal operation.

The above is the outline of the ACC.

<Lane Change Assist Control (LCA)>

The lane change assist control will next be described. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. That is, the lane change assist control can have the own vehicle change lanes without the driver's steering operation (steering wheel operation). In the following, the lane change assist control is referred to as "LCA".

Similarly to the LTA, the LCA is control of a lateral position of the own vehicle with respect to the lane, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

Figure 5:
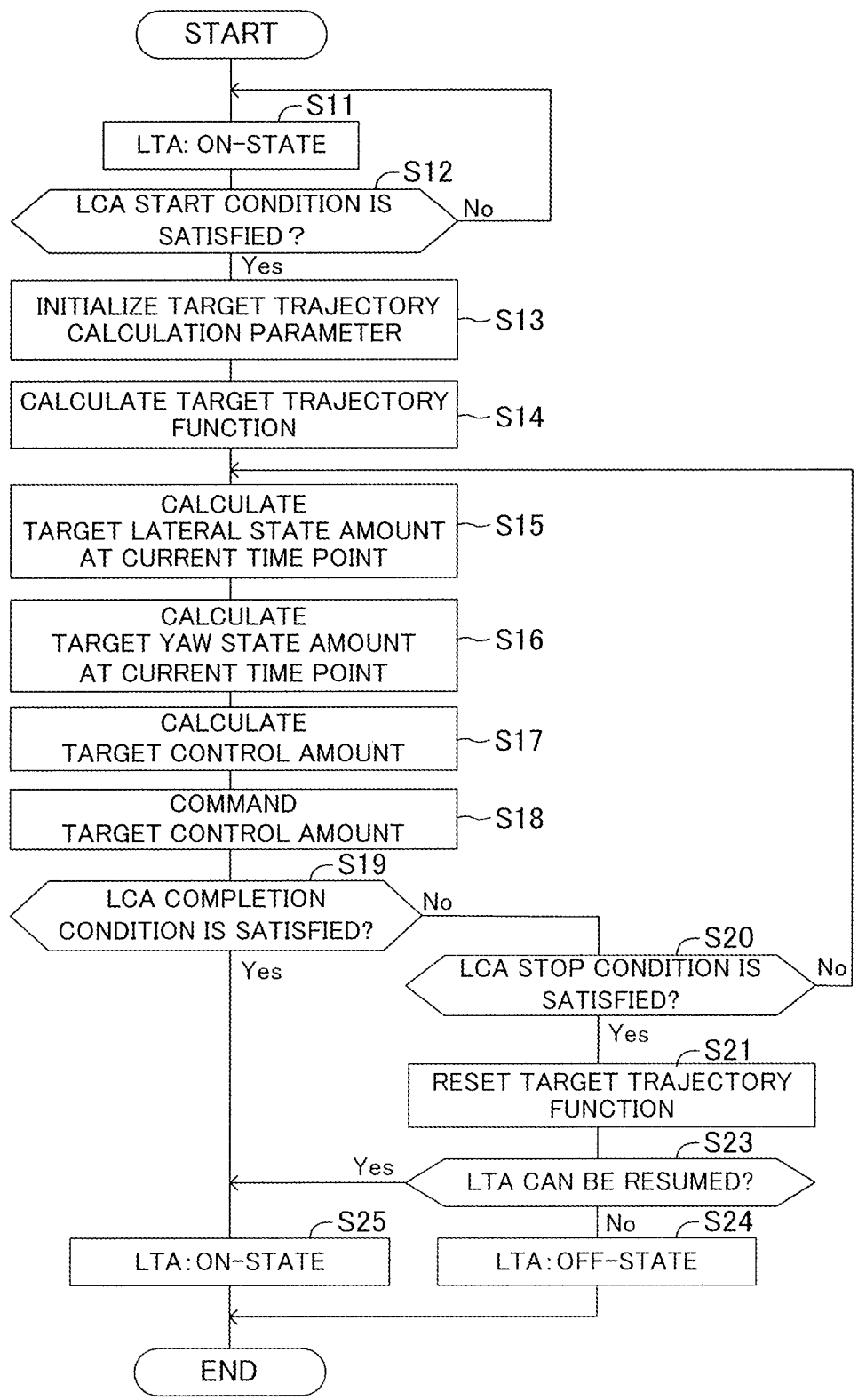
FIG. 5 is a flowchart for illustrating a steering assist control routine according to the embodiment.

FIG. 5 illustrates a steering assist control routine executed by the driving support ECU 10. The steering assist control routine is executed when a LTA execution accept condition is satisfied. The LTA execution accept condition is satisfied when all of the following conditions and the like are satisfied.

The execution of the LTA has been selected by use of the setting operation unit 14.

The ACC is being executed.

The white lines have been recognized by the camera sensor 12.

As the driving support ECU 10 starts the steering assist control routine, at step S11, the driving support ECU 10 sets the steering assist control state to a "LTA ON-state" to execute the LTA. The "LTA ON-state" refers to the control state in which the LTA is executed.

Next, at step S12, the driving support ECU 10 determines whether or not a LCA start condition is satisfied.

For example, the LCA start condition is satisfied when all of the following conditions (1) to (6) are satisfied.

1. The lane change assist request operation has been detected.

2. The execution of the LCA has been selected by use of the setting operation unit 14.

3. The white line at the side on which the turn signal 32 is flashing is a broken line. That is, the white line which is the boundary between the lane (referred to as an "original lane") in which the own vehicle is currently traveling and a lane adjacent to the original lane (referred to as an "adjacent lane" or a "target lane") is a broken line.

4. It is determined, based on the result of monitoring the surroundings of the own vehicle, that the current situation around the own vehicle is a situation in which the LCA is allowed to be executed. That is, no obstacle (e.g., other vehicles, etc.) which obstructs the lane change is detected by the surrounding sensors 11, and thus, the driving support ECU 10 has determined that the lane change can be executed safely.

5. The road on the own vehicle is traveling is a road for exclusive use of automobiles. That is, the road type information acquired from the navigation ECU 70 represents that a road on which the own vehicle is traveling is for exclusive use of automobiles.

6. The vehicle speed of the own vehicle is within a predetermined vehicle speed range for accepting the execution of the LCA.

For example, even when an other-vehicle is present in the target lane, if an inter-vehicle distance between the own vehicle and that other-vehicle traveling in the target lane is suitably/sufficiently ensured in view of a relative speed between the own vehicle and that other-vehicle, the above-mentioned condition 4 is satisfied.

The LCA start condition is not limited to the above-mentioned conditions 1 to 6. In place of one of the conditions 1 to 6, or in addition to the conditions 1 to 6, the LCA start condition may include other conditions.

When the LCA start condition is not satisfied, the driving support ECU 10 returns to step S11 and continues executing the LTA.

When the LCA start condition is satisfied during the execution of the LTA (S12: Yes), the driving ECU 10 executes the LCA in place of the LTA. At the start of the LCA, the driving support ECU 10 transmits to the meter ECU 30 a command for displaying start-guidance for the LCA. Therefore, the start-guidance for the LCA is displayed on the display unit 31.

When the driving support ECU 10 starts the LCA, at step S13, the driving support ECU 10 first executes a process for initializing target trajectory calculation parameters. The target trajectory calculation parameters are used for calculation of a target trajectory. The target trajectory for the LCA will be described below.

Figure 6:
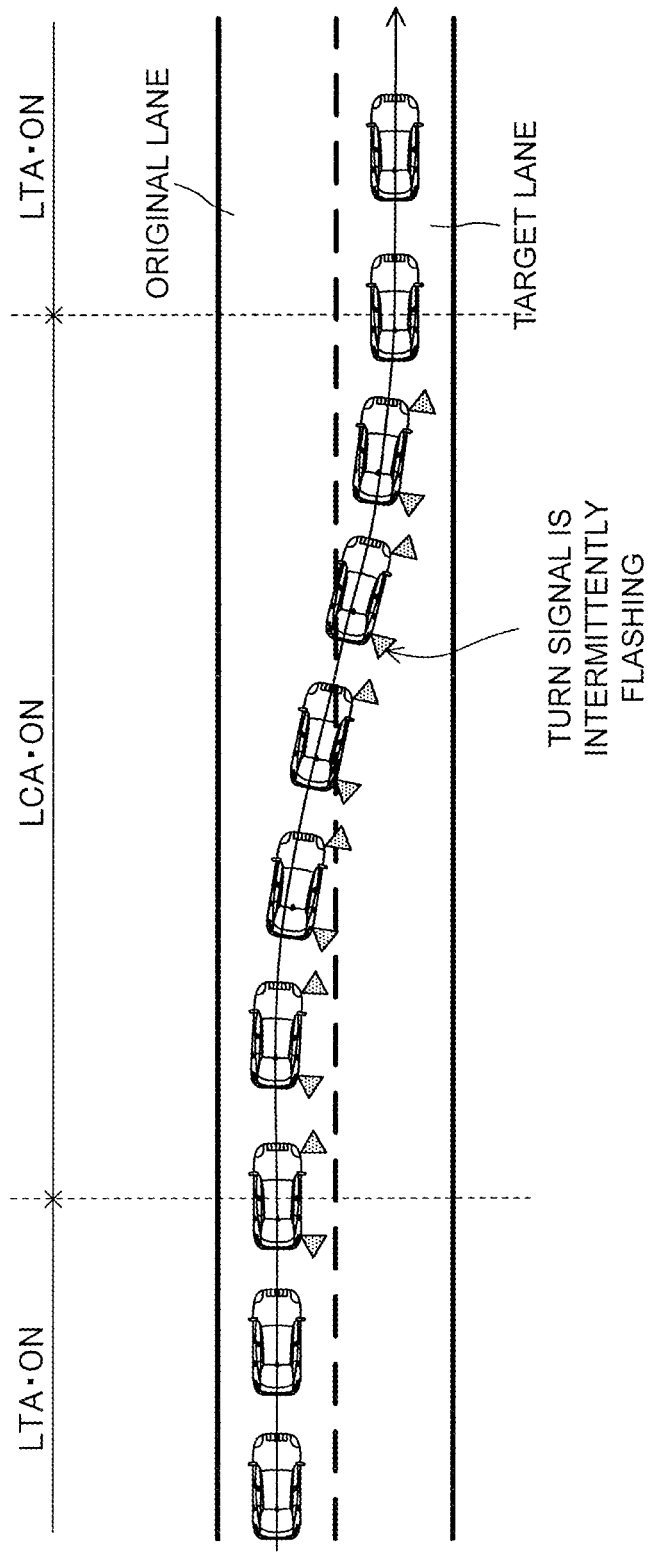
FIG. 6 is a diagram for illustrating a trajectory of the vehicle.

When executing the LCA, the driving support ECU 10 determines/specifies a target trajectory function for defining/determining the target trajectory of the own vehicle. The target trajectory is a trajectory along which the own vehicle is to be moved, for a "target lane change time period", from the lane (original lane) in which the own vehicle is currently traveling to the center position in the width direction (referred to as a "final target lateral position") of the target lane specified by the information included in the lane change assist request signal, which is adjacent to the original lane. The target trajectory has, for example, a shape as illustrated in FIG. 6.

As described later, the target trajectory function is a function of an elapsed time from the start of the LCA (as a variable), and for calculating a target lateral position of the own vehicle for (corresponding to) each elapsed time with reference to the lane center line CL of the original lane. Here, the lateral position of the own vehicle represents the position of the center of gravity of the own vehicle in the lane width direction (also referred to as "lateral direction") with reference to the lane center line CL.

The target lane change time period is varied in proportion to a distance (hereinafter referred to as a "necessary lateral distance") required to move the own vehicle in the lateral direction from the initial (lateral) position at the start of the LCA to the final target lateral position. When the lane width is 3.5 m as in the case of typical roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to 9.1 (=8.0×4.0/3.5) seconds which is a value corresponding to the lane width.

Further, when the lateral position of the own vehicle at the start of the LCA is shifted/deviated toward the target lane (i.e., to the adjacent lane side of a destination of changing lanes) with respect to the lane center line CL of the original lane, the target lane change time period is decreased (is made shorter) as the shift/deviation amount (magnitude of the lateral difference Dy) is increased. On the other hand, when the lateral position of the own vehicle at the start of the LCA is shifted/deviated to a side opposite to the target lane with respect to the lane center line CL of the original lane, the target lane change time period is increased (is made longer) as the shift/deviation amount (magnitude of the lateral difference Dy) is increased. For example, when the shift/deviation amount is 0.5 m, the increase/decrease adjustment amount of the target lane change time period may be 1.14 (=8.0×0.5/3.5) seconds. The above-mentioned values for setting the target lane change time period are merely examples, and thus, any other values may be adopted.

In this embodiment, the target lateral position y is calculated in accordance with the target trajectory function y(t) expressed by Expression (2). The target trajectory function y(t) is a fifth-order function of the elapsed time t serving as a variable.

$$y(t)=c_0+c_1 \cdot t+c_2 \cdot t^2+c_3 \cdot t^3+c_4 \cdot t^4+c_5 \cdot t^5 \qquad (2)$$

This target trajectory function y(t) is a function for moving the own vehicle to the final target lateral position smoothly.

In Expression (2), the constants $c_0$, $c_1$, $c_2$, $c_3$, $c_4$, and $c_5$ are determined based on a state (i.e., an "initial lateral state amount" to be described later) of the own vehicle at the start of the LCA and a target state (i.e., a "final target lateral state amount" to be described later) of the own vehicle at the completion of the LCA.

Figure 7:
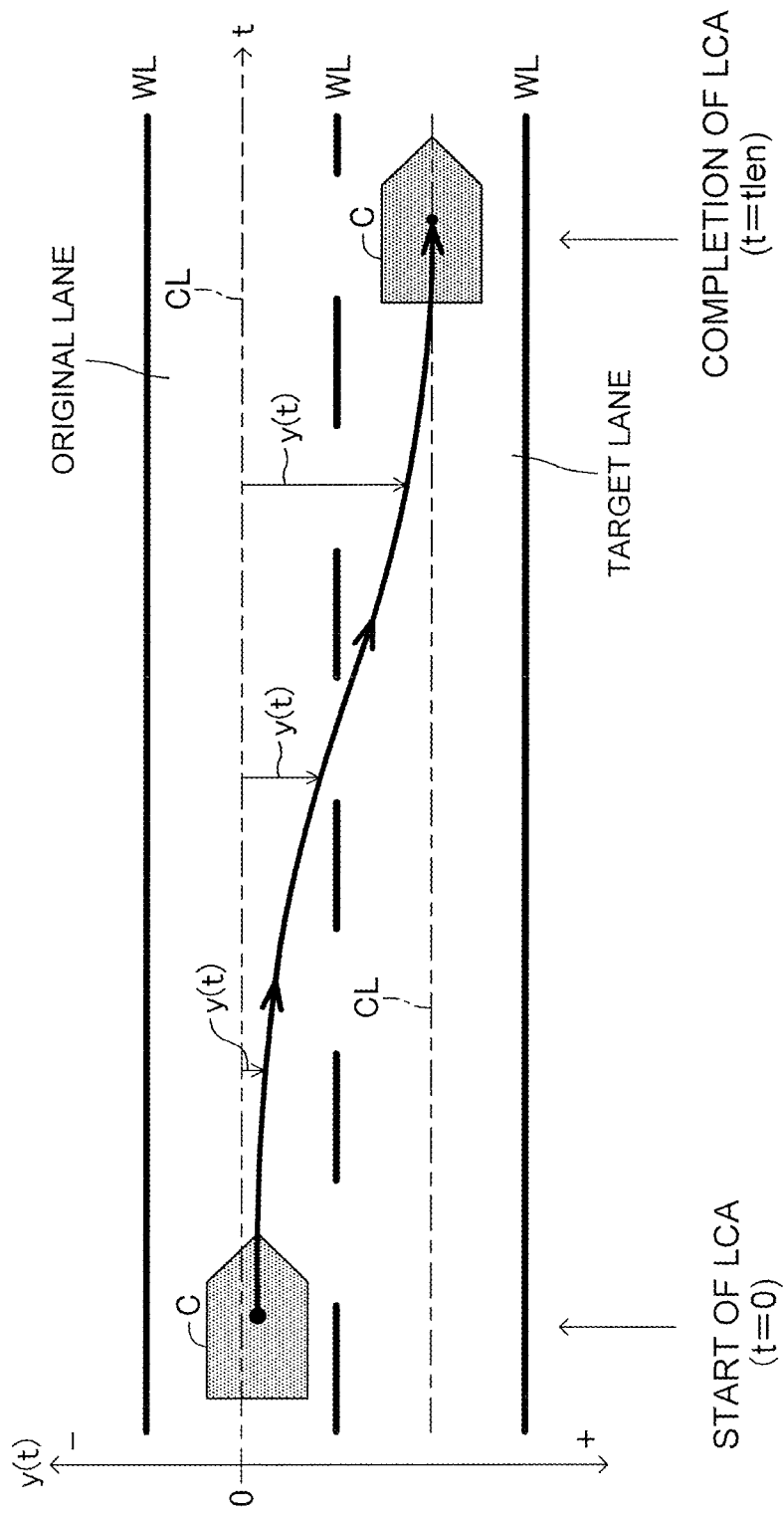
FIG. 7 is a diagram for illustrating a target trajectory function.
Figure 8:
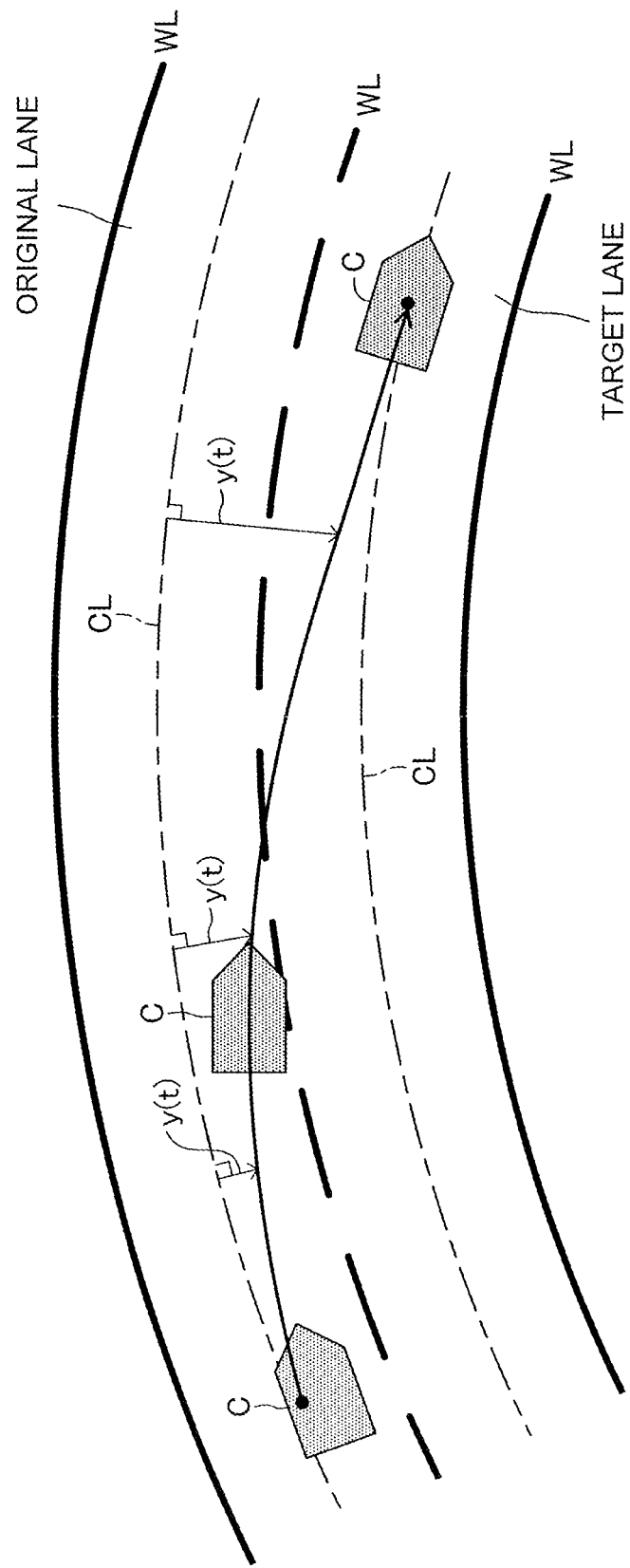
FIG. 8 is a diagram for illustrating a target trajectory function.

For example, as illustrated in FIG. 7, the target trajectory function y(t) is a function for calculating the target lateral position y(t) of the own vehicle C corresponding to an elapsed time t (also referred to as the "present time") from the start of the LCA (at the time of the calculation of the target trajectory), with reference to the lane center line CL of the lane (original lane) in which the own vehicle C is currently traveling. In FIG. 7, both of the original lane and the target lane are straight. However, in a case in which both of the original lane and the target lane are curved, as illustrated in FIG. 8, the target trajectory function y(t) can be said to be a function for calculating the target lateral position of the own vehicle C with respect to the curved lane center line CL of the original lane, using the curved lane center line CL as the reference/standard line.

The above-mentioned target trajectory calculation parameters include parameters for defining/determining the constants $c_0$, $c_1$, $c_2$, $c_3$, $c_4$, and $c_5$ of the target trajectory function y(t). Specifically, the target trajectory calculation parameters include the following parameters P1 to P7.

P1: the lateral position (hereinafter referred to as an "initial lateral position") of the own vehicle with respect to the lane center line of the original lane at the start of the LCA.

P2: the speed (hereinafter referred to as an "initial lateral speed") of the own vehicle in the lateral direction at the start of the LCA.

P3: the acceleration (hereinafter referred to as an "initial lateral acceleration") of the own vehicle in the lateral direction at the start of the LCA.

P4: the target lateral position (final target lateral position) of the own vehicle with respect to the lane center line of the original lane at the completion of the LCA.

P5: a target speed (hereinafter referred to as a "final target lateral speed") of the own vehicle in the lateral direction at the completion of the LCA.

P6: a target acceleration (hereinafter referred to as a "final target lateral acceleration") of the own vehicle in the lateral direction at the completion of the LCA.

P7: the target lane change time period which is a target time period from the start of the LCA to the completion of the LCA (i.e., a time length of a period while the LCA is executed).

Further, the above-mentioned lateral direction means the width direction of the lane.

The initial lateral position is set to the same value as the lateral difference Dy detected by the camera sensor 12 at the start of the LCA. The initial lateral speed is set to a value $(v \cdot \sin(\theta y))$ obtained by multiplying a vehicle speed v by a sine value $(\sin(\theta y))$ of the yaw angle $\theta y$. The vehicle speed v is a value detected by the vehicle speed sensor at the start of the LCA, and the yaw angle $\theta y$ is a value detected by the camera sensor 12 at the start of the LCA. Further, the initial lateral acceleration may be set to a differential value of the initial lateral speed. However, the initial lateral acceleration may be preferably set to a value $(v \cdot \gamma)$ obtained by multiplying a yaw rate $\gamma$ (rad/s) detected by the yaw rate sensor at the start of the LCA by the vehicle speed v. This is because, in the case where the yaw rate $\gamma$ (rad/s) detected by the yaw rate sensor is used, the change in the behavior of the own vehicle can be detected more quickly than in the case where the yaw angle $\theta y$ detected by the camera sensor 12 is used. The initial lateral position, the initial lateral speed, and the initial lateral acceleration are collectively referred to as an "initial lateral state amount (or, index, quantity)".

In this embodiment, it is considered/regarded that the lane width of the target lane is the same as the lane width of the original lane detected by the camera sensor 12 (since the lane width of the target lane is the same as that of the original lane in most cases). Therefore, in the case where the own vehicle is traveling on the lane center line CL of the original lane, the final target lateral position is set to the same value as the lane width of the original lane (the final target lateral position=the lane width of the original lane). Further, both of the final target lateral speed and the final target lateral acceleration are set to zero. The final target lateral position, the final target lateral speed, and the final target lateral acceleration are collectively referred to as a "final target lateral state amount (or index, quantity)".

As described above, the target lane change time period is calculated based on the lane width (which may be the lane width of the original lane) and the shift/deviation amount of the own vehicle in the lateral direction at the start of the LCA. For example, the target lane change time period "tlen" is calculated in accordance with Expression (3).

$$tlen = Dini \cdot A \quad (3)$$

"Dini" is a necessary distance for moving the own vehicle in the lateral direction from the position (initial lateral position) at the start of the LCA to the position (final target lateral position) at the completion of the LCA. Therefore, in the case where the own vehicle is positioned at the lane center line CL of the original lane at the start of the LCA, "Dini" is set to the same value as the lane width. In the case where the own vehicle is shifted/deviated from the lane center line CL of the original lane, "Dini" is set to a value obtained by adding the shift/deviation amount to the lane width or obtained by subtracting the shift/deviation amount from the lane width. "A" is a constant which is a "target time" taken for moving the own vehicle in the lateral direction by a unit distance, and is set to 2.29 sec/m (=8 sec/3.5 m), for example. In this case, when the "required distance Dini" for moving the own vehicle in the lateral direction is 3.5 m, the "target lane change time period tlen" is set to 8 seconds.

The constant A is not limited to the above-mentioned value, but may be set to any value. Further, the setting operation unit 14 may be configured in such a manner that the driver can select a value as the constant A from a plurality of values by using the setting operation unit 14 according to the driver's preference. Alternatively, the target lane change time period may be a fixed value.

The process for initializing the target trajectory calculation parameters at step S13 is the process for setting the above-mentioned seven parameters (the initial lateral position, the initial lateral speed, the initial lateral acceleration, the final target lateral position, the final target lateral speed, the final target lateral acceleration, and the target lane change time period) in the manner described above.

After executing the process for initializing the target trajectory calculation parameters at step S13, the driving support ECU 10 executes a derivation process of (for determining) the target trajectory function at step S14. Specifically, the driving support ECU 10 calculates the constants $c_0$, $c_1$, $c_2$, $c_3$, $c_4$, and $c_5$ of the target trajectory function y(t) expressed by Expression (2) based on the initial lateral state amount, the final target lateral amount, and the target lane change time period, to thereby define/finalize the target trajectory function y(t).

The lateral speed y'(t) is expressed by Expression (4) based on the target trajectory function y(t) expressed by Expression (2). Further, the lateral acceleration y''(t) is expressed by Expression (5).

$$y'(t) = c_1 + 2 \cdot c_2 \cdot t + 3 \cdot c_3 \cdot t^2 + 4 \cdot c_4 \cdot t^3 + 5 \cdot c_5 \cdot t^4 \quad (4)$$

$$y''(t) = 2 \cdot c_2 + 6 \cdot c_3 \cdot t + 12 \cdot c_4 \cdot t^2 + 20 \cdot c_5 \cdot t^3 \quad (5)$$

Here, the initial lateral position is represented by "y0", the initial lateral speed is represented by "vy0", the initial lateral acceleration is represented by "ay0", the final target lateral position is represented by "y1", the final target lateral speed is represented by "vy1", the final target lateral acceleration is represented by "ay1", and the lane width of the original lane is represented by "W". Based on the above-mentioned target trajectory calculation parameters, the following Expressions are obtained.

$$y(0) = c_0 = y0 \quad (6)$$

$$y'(0) = c_1 = vy0 \quad (7)$$

$$y''(0) = 2 \cdot c_2 = ay0 \quad (8)$$

$$y(tlen) = c_0 + c_1 \cdot tlen + c_2 \cdot tlen^2 + c_3 \cdot tlen^3 + c_4 \cdot tlen^4 + c_5 \cdot tlen^5 = y1 = W \quad (9)$$

$$y'(tlen) = c_1 + 2 \cdot c_2 \cdot tlen + 3 \cdot c_3 \cdot tlen^2 + 4 \cdot c_4 \cdot tlen^3 + 5 \cdot c_5 \cdot tlen^4 = vy1 = 0 \quad (10)$$

$$y''(tlen) = 2 \cdot c_2 + 6 \cdot c_3 \cdot tlen + 12 \cdot c_4 \cdot tlen^2 + 20 \cdot c_5 \cdot tlen^3 = ay1 = 0 \quad (11)$$

Therefore, from the above Expressions (6) to (11), the constants $c_0$, $c_1$, $c_2$, $c_3$, $c_4$, and $c_5$ of the target trajectory function y(t) are obtained. Subsequently, through substituting the obtained constants $c_0$, $c_1$, $c_2$, $c_3$, $c_4$, and $c_5$ for Expression (2), the target trajectory function y(t) is derived/defined. The driving support ECU 10 stores and maintains the target trajectory function y(t) in the RAM until the LCA is terminated. At the same time as the derivation of the target trajectory function y(t), the driving support ECU 10 activates a clock timer (initial value: zero) to start counting up the elapsed time t from the start of the LCA.

Next, at step S15, the driving support ECU 10 calculates a target lateral state amount of the own vehicle at the current time point. The target lateral state amount includes a target lateral position which is a target value of the lateral position of the own vehicle in the lane width direction, a target lateral speed which is a target value of the speed (lateral speed) of the own vehicle in the lane width direction, and a target lateral acceleration which is a target value of the acceleration (lateral acceleration) of the own vehicle in the lane width direction. The lateral speed and the lateral acceleration are collectively referred to as a "lateral movement state amount". The target lateral speed and the target lateral acceleration are collectively referred to as a "target lateral movement state amount".

The driving support ECU 10 calculates the target lateral position at the current time point, the target lateral speed at the current time point, and the target lateral acceleration at the current time point, based on the target trajectory function y(t) derived/defined at step S14 and the present time "t". The present time "t" is the elapsed time after the target trajectory function y(t) has been derived/defined at step S14, which is equivalent to the elapsed time from the start of the LCA, as can be understood from processes described later. As described above, after the driving support ECU 10 derives/determines the target trajectory function y(t) at step S14, the driving support ECU 10 resets the clock timer to start counting up the elapsed time "t" (=the present time t) from the start of the LCA. The target lateral position is calculated through applying/assigning the present time t to the target trajectory function y(t). The target lateral speed is calculated through applying/assigning the present time t to the function y'(t) obtained by first-order differentiating the target trajectory function y(t). The target lateral acceleration is calculated through applying/assigning the present time t to the function y"(t) obtained by second-order differentiating the target trajectory function y(t). The driving support ECU 10 reads the elapsed time t measured by the clock timer. The driving support ECU 10 calculates the target lateral state amount based on the measured elapsed time t and the above-mentioned functions.

Hereinafter, the target lateral position at the present time t is represented by "y*", the target lateral speed at the present time t is represented by "vy*", and the target lateral acceleration at the present time t is represented by "av*". A functional unit/module of the driving support ECU 10 for calculating the target lateral position y* at step S15 corresponds to a "target lateral position calculation unit" of the present invention. Further, a functional unit/module of the driving support ECU 10 for calculating the target lateral speed vy* and the target lateral acceleration av* at step S15 corresponds to a "target lateral movement state amount calculation unit" of the present invention.

Next, at step S16, the driving support ECU 10 calculates a target yaw state amount which is a target value relating to a movement for changing the direction of the own vehicle (direction of the vehicle body). The target yaw state amount includes a target yaw angle θy* of the own vehicle at the present time t (current time point t), a target yaw rate γ* of the own vehicle at the present time t (current time point t), and a target curvature Cu* of the own vehicle at the present time t (current time point t). The target curvature Cu* is the curvature of the target trajectory for having the own vehicle change lanes, that is, the curvature of a curve component related to the lane change that does not include the curve curvature of the lane.

At step S16, the driving support ECU 10 reads the vehicle speed v at the present time t (current time point t) (the current vehicle speed detected by the vehicle speed sensor). Further, the driving support ECU 10 calculates the target yaw angle θy* at the present time t (current time point t), the target yaw rate γ* at the present time t (current time point t), and the target curvature Cu* at the present time t (current time point t) in accordance with Expressions (12) to (14) described below, respectively, based on the vehicle speed v, and the target lateral speed vy* and the target lateral acceleration ay* obtained at step S15.

$$\theta y^* = \sin^{-1}(vy^*/v) \quad (12)$$

$$\gamma^* = ay^*/v \quad (13)$$

$$Cu^* = ay^*/v^2 \quad (14)$$

The target yaw angle θy* is calculated through applying/assigning a value obtained by dividing the target lateral speed vy* by the vehicle speed v to an arc sine function. Further, the target yaw rate γ* is calculated by dividing the target lateral acceleration ay* by the vehicle speed v. Further, the target curvature Cu* is calculated by dividing the target lateral acceleration ay* by a square value of the vehicle speed v. This functional unit/module of the driving support ECU 10 for calculating the target yaw angle θy*, the target yaw rate γ*, and the target curvature Cu* corresponds to a "target yaw state amount calculation unit" of the present invention.

Next, at steps S17, the driving support ECU 10 calculates a target control amount for the LCA. In this embodiment, the driving support ECU 10 calculates a target steering angle θlca* as the target control amount. The target steering angle θlca* is calculated in accordance with Expression (15) described below, based on (i) the target lateral position y* obtained at step S15, (ii) the target yaw angle θy*, the target yaw rate γ*, and the target curvature Cu* obtained at step S16, and (iii) the curvature Cu.

$$\theta lca^* = Klca1\cdot(Cu^*+Cu)+Klca2\cdot(\theta y^*-\theta y)+Klca3\cdot(y^*-y)+Klca4\cdot(\gamma^*-\gamma)+Klca5\cdot\Sigma(y^*-y) \quad (15)$$

In Expression (15), Klta1, Klta2, Klta3, and Klta4 are control gains. "Cu" is the curvature at the present time t (current time point t) (at the time of the calculation of θlca*), the curvature Cu being detected by the camera sensor 12. "y" is the lateral position of the own vehicle at the present time t (current time point t) (at the time of the calculation of θlca*), the lateral position y being detected by the camera sensor 12, that is, corresponds to Dy. "θy" is the yaw angle of the own vehicle at the present time t (current time point t) (at the time of the calculation of θlca*), the yaw angle θy being detected by the camera sensor 12. Further, "γ" is the yaw rate of the own vehicle at the present time t (current time point t), the yaw rate γ being detected by the yaw rate sensor. The control gain Klta1 may be varied in response to the vehicle speed. A differential value of the yaw angle θy may be used as the yaw rate γ.

The first term on the right-hand side of the Expression (15) is a steering angle component which is determined in accordance with a sum of the target curvature C* and the curvature Cu (the curve curvature of the lane) and acts in a feed-forward manner. "Klca1·Cu*" is a feed-forward control amount for having the own vehicle change lanes, and "Klca1·Cu" is a feed-forward control amount for having the own vehicle travel along a curved lane with the curvature Cu. The second term on the right-hand side of the Expression (15) is a steering angle component that acts in the feed-back manner so that the deference between the target yaw angle θy* and the actual yaw angle θy is decreased. The third term on the right-hand side of the Expression (15) is a steering angle component that acts in a feed-back manner so that the difference between the target lateral position y* and the actual lateral position y is decreased. The fourth term on the right-hand side of the Expression (15) is a steering angle component that acts in a feed-back manner so that the difference between the target yaw rate γ* and the actual yaw rate γ is decreased. The fifth term on the right-hand side of the Expression (15) is a steering angle component that acts in a feed-back manner so that an integral value Σ(y*−y) of the difference between the target lateral position y* and the actual lateral position y is decreased. Therefore, the first term on the right-hand side of the Expression (15) represents the feed-forward control amount, and the second to fifth terms on the right-hand side of the Expression (15) represent the feed-back control amount(s).

The calculation method of the target steering angle θlca* is not limited to the above-mentioned method where the target steering angle θlca* is calculated by using the above-mentioned five steering angle components. The target steering angle θlca* may be calculated by using at least one steering angle component among the above-mentioned five steering angle components, or may be calculated by using any other steering angle component(s) in addition to the above-mentioned five steering angle components or in place of at least one of the above-mentioned five steering angle components. As the feed-back control amount relating to the yaw movement, either one of the "deference between the target yaw angle θy* and the actual yaw angle θy" and the "difference between the target yaw rate γ* and the actual yaw rate γ" may be used. Further, the feed-back control amount using the integral value Σ(y*−y) of the difference between the target lateral position y* and the actual lateral position y may be omitted.

After calculating the target control amount at step S17, at the next step S18, the driving support ECU 10 transmits a steering command including information on (representing) the target control amount to the EPS ECU 20. In this embodiment, the driving support ECU 10 calculates the target steering angle θlca* as the target control amount. However, the driving support ECU 10 may calculate a target torque corresponding to the target steering angle θlca* and transmit a steering command including information on (representing) the target torque to the EPS ECU 20.

When the EPS ECU 20 receives the steering command transmitted from the driving support ECU 10 via the CAN 100, the EPS ECU 20 drives (controls) the steering motor 22 in such a manner that the steering angle follows (becomes equal to) the target steering angle θlca*.

Next, at step S19, the driving support ECU 10 determines whether or not a LCA completion condition is satisfied. In this embodiment, the LCA completion condition is satisfied when the lateral position y of the own vehicle reaches the final target lateral position (y*=y1). When the LCA completion condition is not satisfied, the driving support ECU 10 proceeds the process to step S20.

At step S20, the driving support ECU 10 determines whether or not a LCA stop condition is satisfied. The LCA stop condition is a condition for stopping/terminating the LCA under (or in the middle of) the execution of the LCA (before the completion of the LCA). The LCA stop condition is satisfied, for example, when the driving support ECU 10 detects a specific operation performed by the driver and/or when the driving support ECU 10 determines that it is difficult to continue/maintain the LCA.

For example, when at least one of the following specific operations (i) to (iv) is detected, the driving support ECU 10 determines that the LCA stop condition is satisfied.

(i) The driving support ECU 10 has detected the steering torque owing to the driver's steering wheel operation which is greater than a predetermined value.

(ii) The driving support ECU 10 has detected the brake operation of the driver.

(iii) The driving support ECU 10 has detected the operation of the turn signal lever 41 in the direction opposite to the current lane change direction.

(iv) The driving support ECU 10 has detected the operation applied to the setting operation unit 14 to set the setting of the LCA to OFF (to stop executing the LCA).

Further, when at least one of the following conditions (v) and (vi) is satisfied, the driving support ECU 10 determines that it is difficult to continue executing the LCA to determine that the LCA stop condition is satisfied.

(v) It is determined, based on the result of monitoring the surroundings of the own vehicle, that the current situation around the own vehicle is a situation in which the LCA is not permitted/allowed to be executed. For example, the surrounding sensors 11 have detected an obstacle which obstructs the lane change.

(vi) It is determined that the white line at the side on which the turn signal 32 is flashing is not a broken line.

When the LCA stop condition is not satisfied (S20: No), the driving support ECU 10 returns the process to step S15, and repeats the above-mentioned processes of steps S15 to S20 every time the predetermined time period (calculation period) elapses. Therefore, the target lateral state amount (y*, vy*, and ay*) is calculated in response to the elapsed time t, and then, the target yaw state amount (θy*, γ*, and Cu*) is calculated based on the calculated target lateral state amount (y*, vy*, and ay*) and the vehicle speed v. Further, the target control amount (θlca*) is calculated based on the calculated target yaw state amount (θy*, γ*, and Cu*).

Every time the driving support ECU 10 calculates/updates the target control amount (θlca*), the driving support ECU 10 transmits the steering command including the information on (representing) the target control amount (θlca*) to the EPS ECU 20. In this manner, the driving support ECU 10 can have the own vehicle travel along (according to) the target trajectory.

The driving support ECU 10 receives from the camera sensor 12 the lane-related vehicle information (Cu, Dy, and θy) relating to the lane in which the own vehicle is currently traveling. When the traveling position of the own vehicle is switched from the original lane to the target lane, the lane-related vehicle information (Cu, Dy, and θy) to be transmitted from the camera sensor 12 to the driving support ECU 10 is switched from the lane-related vehicle information (Cu, Dy, and θy) associated with the original lane to the lane-related vehicle information (Cu, Dy, and θy) associated with the target lane. Therefore, when the traveling position of the own vehicle is switched from the original lane to the target lane, the sign (plus or minus) of the lateral difference Dy is reversed. When the driving support ECU 10 has detected the change in the sign of the lateral difference Dy transmitted from the camera sensor 12, the driving support ECU 10 shifts the target trajectory function y(t) expressed by Expression (2) by the lane width W. Specifically, the driving support ECU 10 converts the target trajectory function y(t) expressed by Expression (2) into a target trajectory function y(t) expressed by Expressions (2A) or (2B) described below depending on the lane change direction, by substantially shifting the target trajectory function y(t) expressed by Expression (2) by the lane width W. Therefore, the apparatus according to the present embodiment can convert "the target trajectory function calculated based on the lane center line of the original lane which serves as the origin" into "the target trajectory function based on the lane center line of the target lane which serves as the origin".

$$y(t) = W - |c_0 + c_1 \cdot t + c_2 \cdot t^2 + c_3 \cdot t^3 + c_4 \cdot t^4 + c_5 \cdot t^5| \quad (2A)$$

$$y(t) = -(W - |c_0 + c_1 \cdot t + c_2 \cdot t^2 + c_3 \cdot t^3 + c_4 \cdot t^4 + c_5 \cdot t^5|) \quad (2B)$$

When the driving support ECU 10 determines that the LCA completion condition is satisfied at step S19, the driving support ECU 10 sets the steering assist control state to the LTA ON-state at step S25. That is, the driving support ECU 10 terminates/ends the LCA and resumes the LTA. Therefore, the steering assist control (LTA) is performed in such a manner that the own vehicle travels according to the lane center line CL of the target lane (in which the own vehicle is traveling).

In contrast, when the LCA stop condition becomes satisfied before the LCA completion condition is satisfied (S19: No and S20: Yes), at step S22, the driving support ECU 10 resets the target trajectory function y(t), and terminates/ends the LCA. Further, the driving support ECU 10 resets the elapsed time t measured by the clock timer to zero. At this time, the driving support ECU 10 transmits to the meter ECU 30 a display command for displaying a message which informs the driver of the termination of the steering assist control (i.e., LCA). When the meter ECU 30 receives the display command, the meter ECU 30 displays the message on the display unit 31.

Next, at step S23, the driving support ECU 10 determines whether or not the LTA is allowed to be resumed. When the driving support ECU 10 determines that the LTA is allowed to resumed, the driving support ECU 10 proceeds the process to step S25, and sets the steering assist control state to the LTA ON-state. Therefore, the LCA is terminated, and the LTA is resumed (starts being executed).

On the other hand, when the driving support ECU 10 determines that the LTA is not allowed to be resumed, the driving support ECU 10 proceeds the process to step S24, and sets the steering assist control state to the LTA OFF-state. Therefore, the steering assist control (both the LCA and the LTA) is terminated.

For example, when the LCA stop condition is determined to be satisfied at step S20 since the specific operation performed by the driver is detected, it is presumed that the driver does not want the steering assist control to be performed. In this case, the driving support ECU 10 determines that the LTA cannot be resumed. On the other hand, even when the driving support ECU 10 determines that it is difficult to execute the LCA, and thus the LCA is terminated, in the case where there is no difficulty in resuming the LTA (for example, in the case where the white line at the side on which the turn signal 32 is flashing becomes a line other than the broken line), the LTA is permitted/allowed to be resumed.

After setting the steering assist control state at step S24 or step S25, the driving support ECU 10 tentatively terminates the steering assist control routine. In the case where the driving support ECU 10 sets the steering assist control state to the LTA OFF-state at step S24, the driving support ECU 10 resumes the steering assist control routine when the LTA execution accept condition becomes satisfied. In contrast, in the case where the driving support ECU 10 sets the steering assist control state to the LTA ON-state at step S25, the driving support ECU 10 proceeds the process to step S11.

Further, during a period in which the driving support ECU 10 is executing the LCA (Steps 13 to 20), the driving support ECU 10 continues transmitting, to the meter ECU 30, a flashing command to intermittently flash the turn signal 32 (at the side) corresponding to the operation direction of the turn signal lever 41. The turn signal 32 starts to be intermittently-flashed before the LCA is started, in response to the flashing command which starts to be transmitted from the steering ECU 40 when the turn signal lever 41 is operated to be positioned at the first stroke position P1L (P1R). Even when and after the steering ECU 40 stops transmitting the flashing command, the turn signal 32 continues intermittently-flashing in response to the flashing command transmitted from the driving support ECU 10. In this case, a time point at which intermittently-flashing of the turn signal 32 is terminated may be the same as the timepoint of the completion of the LCA or before the completion of the LCA. For example, the intermittently-flashing of the turn signal 32 may be terminated when the own vehicle reaches a lateral position which is away (in the original lane side) from the final target lateral position by a predetermined extinguishment permission distance (for example, 50 cm).

In the lane change assist apparatus according to the present embodiment described above, when executing the LCA, the driving support ECU 10 calculates the target trajectory function y(t) based on the initial lateral position, the initial lateral speed, the initial lateral acceleration, the final target lateral position, the final target lateral speed, the final target lateral acceleration, and the target lane change time period. While the LCA is being executed, the driving support ECU 10 successively (sequentially) calculates the target lateral position y*, the target lateral speed vy*, and the target lateral acceleration ay* in accordance with the elapsed time t from the start of the LCA (for each elapsed time t). Further, the driving support ECU 10 successively (sequentially) acquires the vehicle speed v at the current time point (present time) t. The driving support ECU 10 successively (sequentially) calculates the target yaw angle θy*, the target yaw rate γ*, and the target curvature Cu* which are target values relating to the movement for changing the direction of the own vehicle, based on the acquired vehicle speed v, the target lateral speed vy*, and the target lateral acceleration ay*. The driving support ECU 10 controls the steering of right and left steered wheels based on the target lateral position y*, the target yaw angle θy*, the target yaw rate γ*, and the target curvature Cu*. Therefore, the lane change assist apparatus according to the present embodiment is able to have the own vehicle change lanes smoothly according to the target trajectory function.

Further, the calculation of the target trajectory function (calculation for determining the constants $c_0$, $c_1$, $c_2$, $c_3$, $c_4$, and $c_5$) is performed only once at the start of the LCA (in other words, in order to determine/derive the target trajectory function at the start of the LCA, it is sufficient to make the calculation only once). Thus, the calculation load of the microcomputer of the driving support ECU 10 can be reduced. After determining/calculating the target trajectory function, the vehicle speed is successively (sequentially) acquired, and the target yaw state amount is calculated in response to the vehicle speed at the current time point. Therefore, even if the vehicle speed is changed through the accelerator pedal operation during the LCA, smooth lane change can be achieved/performed while reflecting (making consideration of) the accelerator pedal operation through the driver. Further, the smooth lane change can be achieved/performed in cooperation with acceleration/deceleration control through the ACC.

Further, according to the present embodiment, the target trajectory function is set/determined based on the initial lateral state amount of the own vehicle and the final target lateral state amount, and the target lane change time period. The target trajectory function is expressed as a fifth-order function of the elapsed time from the start of the LCA which serves as a variable. Therefore, when the own vehicle moves in the lateral direction (lane width direction), the lateral state amount of the own vehicle can smoothly be varied from the initial lateral state amount to the final target lateral state amount. Accordingly, the lane change can be performed more smoothly.

Further, the target lateral speed (final target lateral speed) of the own vehicle at the completion of the LCA and the target lateral acceleration (final target lateral acceleration) of the own vehicle at the completion of the LCA are both set to zero. In addition, the target lateral position (final target lateral position) of the own vehicle at the completion of the LCA is set to the center position of the target lane in the lane width direction. Therefore, after the completion of the LCA, the driving support ECU 10 can have the own vehicle travel along (according to) the lane center line CL of the target lane with the LTA. Accordingly, the steering assist control can be smoothly switched from the LCA to the LTA.

The lane change assist apparatus according to the embodiment of the present invention has been described, but the present invention is not limited to the above-mentioned embodiment, and various changes are possible within the range not departing from the object of the present invention.

For example, in the above embodiment, it is a prerequisite for carrying out the LCA that the steering assist control state is in the LTA ON-state (that is, the LTA is being executed). In other words, the LCA does not start to be executed unless the steering assist control state is in the LTA ON-state. However, such a prerequisite is not necessarily required to start the LCA. Further, as a prerequisite for carrying out the LCA, there is no need to assume that the ACC is being executed. In other words, the LCA may be able to be started even if the steering assist control state is not in the LTA ON-state. In the above embodiment, the LCA start condition includes the following condition: the road on which the own vehicle is traveling is a road for exclusive use of automobiles. However, the LCA start condition does not necessarily include such a condition.

For example, in the above embodiment, the camera sensor 12 is configured to recognize the lanes. However, the navigation ECU 70 may detect the relative positional relationship of the own vehicle with respect to the lane.

What is claimed is:
1. A lane change assist apparatus for vehicle comprising:
a sensor that recognizes a first lane and a second lane and detects a distance in a lane width direction between an own vehicle and a center line of each of the first lane and the second lane, the first lane being a lane in which the own vehicle is currently traveling, and the second lane being a lane adjacent to the first lane; and
at least one electronic control unit (ECU), including a processor, programmed to:
based on the distance in the lane width direction, control steering of a steered wheel such that the own vehicle changes lanes from the first lane to the second lane to perform lane change assist control,
at a start of the lane change assist control, determine, through a calculation, a target trajectory function y(t) for determining a target lateral position which is a target position of the own vehicle in the lane width direction in accordance with an elapse time from the start of the lane change assist control, wherein the target trajectory function y(t) represents a trajectory in the lane width direction such that the own vehicle moves from the first lane to the second lane, wherein the target trajectory function y(t) is calculated only once;
while the lane change assist control is being executed, successively calculate the target lateral position, based on the target trajectory function calculated at the start of the lane change assist control and the elapse time from the start of the lane change assist control;
while the lane change assist control is being executed, successively acquire a vehicle speed of the own vehicle, and successively calculate a target yaw state amount which is a target value related to a movement for changing a direction of the own vehicle by using the target trajectory function calculated at the start of the lane change assist control, the elapse time from the start of the lane change assist control, and the acquired vehicle speed; and
control the steering of the steered wheel based on the target lateral position and the target yaw state amount.

2. The lane change assist apparatus according to claim 1, wherein the at least one ECU is further programmed to:
successively calculate a target lateral movement state amount which is a target value related to a movement of the own vehicle in the lane width direction, based on the target trajectory function calculated at the start of the lane change assist control, and the elapse time from the start of the lane change assist control; and
successively calculate the target yaw state amount based on the acquired vehicle speed and the calculated target lateral movement state amount.

3. The lane change assist apparatus according to claim 2, wherein the at least one ECU is further programmed to:
calculate, as the target lateral movement state amount, a target lateral speed which is a target value of a speed of the own vehicle in the lane width direction, and
calculate, as the target yaw state amount, by using an arc sine of a value obtained by dividing the calculated target lateral speed by the acquired vehicle speed, a target yaw angle which is a target value of an angle on a horizontal plane between a direction in which the own vehicle is facing and a direction of the lane.

4. The lane change assist apparatus according to claim 2, wherein the at least one ECU is further programmed to:
calculate, as the target lateral movement state amount, a target lateral acceleration which is a target value of an acceleration of the own vehicle in the lane width direction, and
calculate, as the target yaw state amount, by dividing the calculated target lateral acceleration by the acquired vehicle speed, a target yaw rate which is a target value of a yaw rate of the own vehicle.

5. The lane change assist apparatus according to claim 2, wherein the at least ECU is further programmed to:

calculate, as the target lateral movement state amount, a target lateral acceleration which is a target value of an acceleration of the own vehicle in the lane width direction, and calculate, as the target yaw state amount, by dividing the calculated target lateral acceleration by a square value of the acquired vehicle speed, a target curvature which is a curvature of a target trajectory expressed by the target trajectory function.

6. The lane change assist apparatus according to claim 1, wherein the target trajectory function is calculated based on:
   (i) a lateral position representing a position of the own vehicle in the lane width direction at the start of the lane change assist control, a lateral speed representing a speed of the own vehicle in the lane width direction at the start of the lane change assist control, and a lateral acceleration representing an acceleration of the own vehicle in the lane width direction at the start of the lane change assist control;
   (ii) the target lateral position of the own vehicle at the completion of the lane change assist control, a target lateral speed which is a target value of a speed of the own vehicle in the lane width direction at the completion of the lane change assist control, and a target lateral acceleration which is a target value of an acceleration of the own vehicle in the lane width direction at the completion of the lane change assist control; and
   (iii) a target lane change time period which is a target time period from the start of the lane change assist control to the completion of the lane change assist control.

7. The lane change assist apparatus according to claim 6, wherein
   the target trajectory function is a fifth-order function of the elapsed time serving as a variable,
   the target lateral speed of the own vehicle at the completion of the lane change assist control, and the target lateral acceleration of the own vehicle at the completion of the lane change assist control are set to zero, and
   the target lateral position of the own vehicle at the completion of the lane change assist control is set to a center position of the adjacent lane in the lane width direction.

* * * * *